United States Patent
Colby (10) Patent No.: US 11,672,366 B2
(45) Date of Patent: Jun. 13, 2023

(54) DISPOSABLE BEVERAGE CUP WITH NON-REMOVABLE STRAW

(71) Applicant: Michael K. Colby, Eagle, ID (US)

(72) Inventor: Michael K. Colby, Eagle, ID (US)

( * ) Notice: Subject to any disclaimer, the term of this patent is extended or adjusted under 35 U.S.C. 154(b) by 348 days.

(21) Appl. No.: 16/858,496

(22) Filed: Apr. 24, 2020

(65) Prior Publication Data

US 2020/0337482 A1   Oct. 29, 2020

Related U.S. Application Data (60) Provisional application No. 62/839,519, filed on Apr. 26, 2019.

(51) Int. Cl.

| A47G 19/22 | (2006.01) |
|---|---|
| B65D 3/06 | (2006.01) |
| A47G 21/18 | (2006.01) |
| B65D 77/28 | (2006.01) |

(52) U.S. Cl.
CPC ..... *A47G 19/2222* (2013.01); *A47G 19/2272* (2013.01); *A47G 21/18* (2013.01); *B65D 3/06* (2013.01); *B65D 77/28* (2013.01)

(58) Field of Classification Search
CPC ............ A47G 19/2222; A47G 19/2272; A47G 21/18; A47G 21/185; B65D 3/06; B65D 77/28; B65D 77/283
See application file for complete search history.

(56) References Cited

U.S. PATENT DOCUMENTS

| 2,948,453 | A | | 8/1960 | Drown | |
|---|---|---|---|---|---|
| 3,406,868 | A | | 10/1968 | Rogers | |
| 3,558,033 | A | * | 1/1971 | Leeds | B65D 77/283 220/710 |
| 4,043,478 | A | * | 8/1977 | Duncan | A47G 19/2266 206/217 |
| 4,228,913 | A | | 10/1980 | Mack et al. | |
| 4,573,631 | A | | 3/1986 | Reeves | |
| 4,830,204 | A | * | 5/1989 | Lin | A47G 19/2266 215/389 |
| 4,928,876 | A | | 5/1990 | Marshall | |
| 5,335,851 | A | | 8/1994 | Adaska et al. | |
| 5,423,476 | A | * | 6/1995 | Ferrer | B65D 3/06 229/404 |
| 7,392,916 | B1 | * | 7/2008 | Kuighadush | B65D 77/283 220/707 |
| 7,398,893 | B2 | | 7/2008 | Boule | |
| 2007/0170188 | A1 | * | 7/2007 | Guillaume | A47G 19/2266 220/710 |

(Continued)

OTHER PUBLICATIONS

"International Search Report and Written Opinion", PCT Application No. PCT/US2020/029985, dated Jul. 13, 2020, 9 pages.

(Continued)

*Primary Examiner* — Shawn M Braden (74) *Attorney, Agent, or Firm* — Colby Nipper PLLC (57) ABSTRACT

This document discloses a disposable beverage cup with a non-removable straw. This disposable beverage cup and non-removable straw substantially reduce, or even eliminate, a chance that the straw will end up, on its own, polluting the world's oceans or land. This is due to the straw being non-removable and, along with the disposable beverage cup, being more likely to be properly disposed of, composted, or otherwise responsibly handled.

20 Claims, 11 Drawing Sheets

Perspective View (56) References Cited

U.S. PATENT DOCUMENTS

2008/0237246 A1* 10/2008 Choi .................... B65D 77/283
                                                            220/705
2018/0153323 A1    6/2018 Andrew
2020/0071028 A1*   3/2020 Chen ...................... B65D 25/04

OTHER PUBLICATIONS

"International Preliminary Report on Patentability", Application No. PCT/US2020/029985, dated Apr. 20, 2021, 8 pages.
"Extended European Search Report", EP Application No. 20795601.2, dated Nov. 25, 2022, 7 pages.

* cited by examiner

Perspective View

DISPOSABLE BEVERAGE CUP WITH NON-REMOVABLE STRAW

RELATED APPLICATIONS

The present disclosure claims priority to U.S. Provisional Patent Application Ser. No. 62/839,519 filed Apr. 26, 2019, the disclosure of which is incorporated by reference herein in its entirety.

BACKGROUND

Throughout the world, disposable cups, lids, and straws are commonly used. While doing so is convenient, and often improves sanitation, health, and reduces environmental costs from washing non-disposable cups and the labor costs associated with doing so, the amount of waste is staggering. It is estimated that, per day, the world uses 500 million straws, one billion disposable cups, and hundreds of millions of disposable lids.

Further, this amount of waste does not even include paper covers for the 500 million straws, and other incidental environmental and economic costs. In the case of straws in particular, some environmental groups estimate that the world's oceans hold a sizable percentage of these straws, amounting to untold billions or even trillions of straws. These straws pollute the water and damage marine life and marine ecosystems.

Even discounting the effect on the world's oceans, straws are relatively light and mobile, causing them to end up on streets, roads, and lands throughout world, polluting human and land-animal environments.

BRIEF DESCRIPTION OF THE DRAWINGS

FIGS. 4-1 and 4-2 illustrate the non-removable straw of FIG. 1 where the non-removable straw is configured to bend.

The same numbers are used throughout the disclosure and figures to reference like components and features.

DETAILED DESCRIPTION

Overview

This document discloses a disposable beverage cup with a non-removable straw. This disposable beverage cup and non-removable straw substantially reduce, or even eliminate, a chance that the straw will end up, on its own, polluting the world's oceans or land. This is due to the straw being non-removable and, along with the disposable beverage cup, being more likely to be properly disposed of, composted, or otherwise responsibly handled.

As noted in part above, there are many problems with the current system of disposable cups and straws being separately used. These include the paper covers for many of the straws used, the relative ease at which straws can be mobile, and therefore misplaced from proper disposal, and the costs of each straw itself.

While current techniques have attempted to address some of these issues, they have done so with little success. For example, some non-disposable cups, generally for children, exist that have a non-removable straw. This solution, however, does not address the vast number of disposable straws polluting the world. Further, this solution is impractical for disposable and sanitary straws, as they are both non-disposable and must be carefully washed to be returned to a sanitary condition.

Further still, these solutions, even if they were somehow made to be sanitary and disposable, would be inconvenient, as they poorly stack, if at all, making them difficult to store and use, especially in fast-service environments like restaurants, coffee shops, and drive-through shops.

Disposable Beverage Cup with Non-Removable Straw

Figure 1:
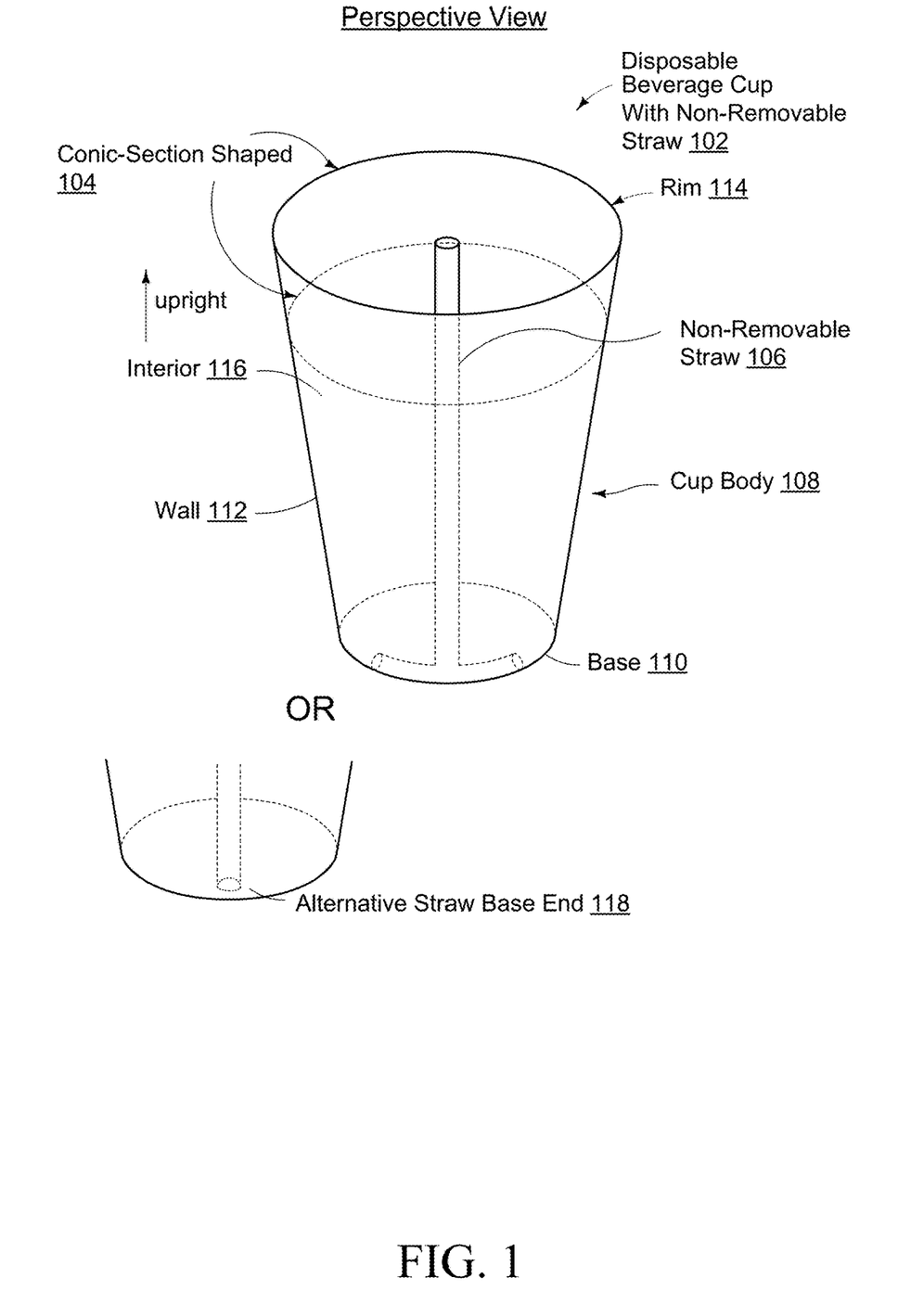
FIG. 1 illustrates an example disposable beverage cup with non-removable straw.

An example disposable beverage cup with non-removable straw 102 is illustrated, in prospective view, in FIG. 1. This disposable beverage cup with non-removable straw 102 is shown having conic-section shapes 104 (at cross sections), though this is not required. The disposable beverage cup with non-removable straw 102 includes a non-removable straw 106 and a cup body 108. The cup body 108 includes a base 110, a wall 112, and a rim 114. The cup body 108 is the cup body configured to retain liquid (e.g., a cold or hot beverage). The wall 112 connects the base 110 and the rim 114 and defines an interior 116 of the disposable beverage cup with non-removable straw 102. The interior 116 is configured to hold the retained liquid so long as the disposable beverage cup with non-removable straw 102 remains upright.

Figure 2:
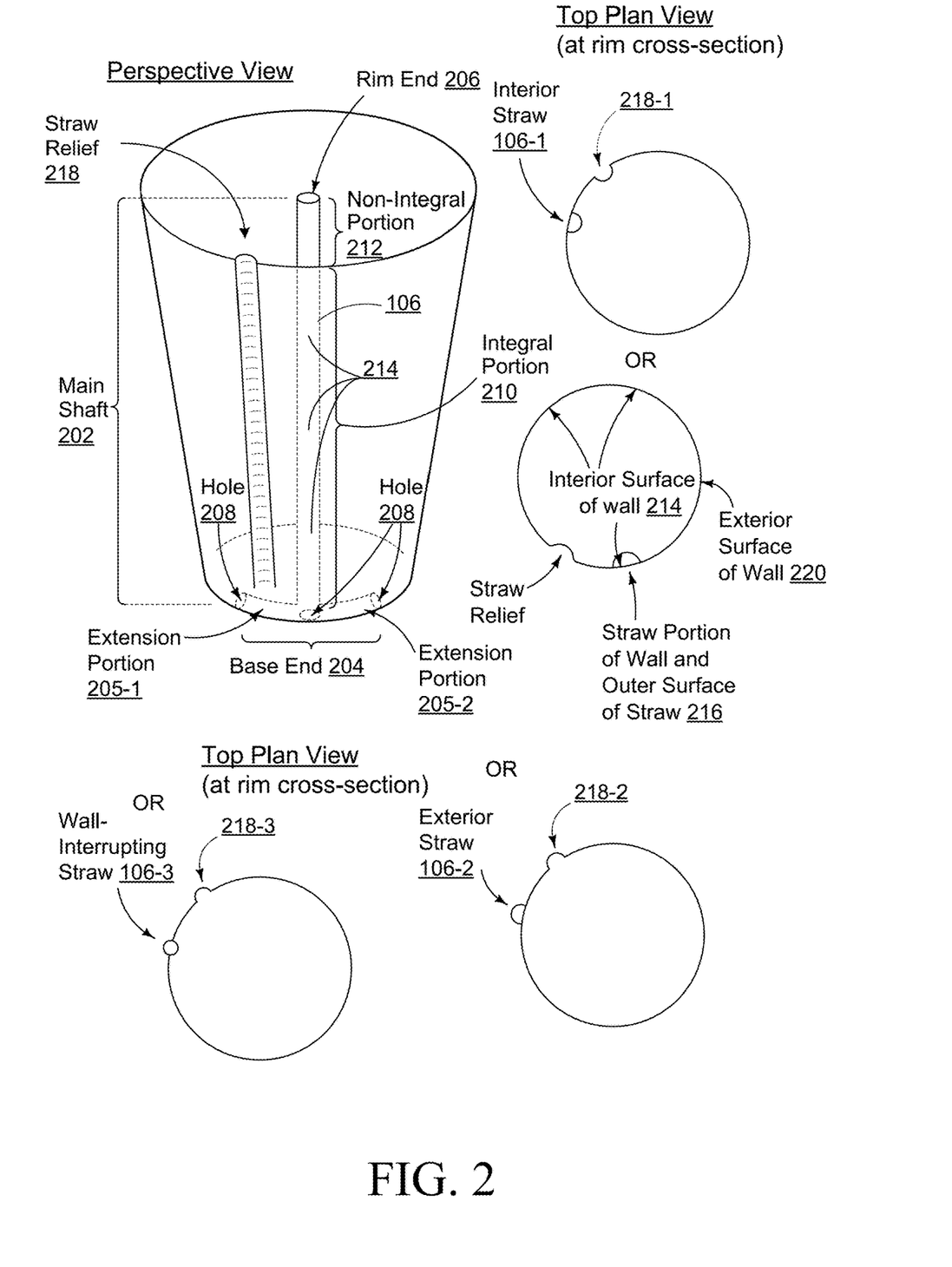
FIG. 2 illustrates the non-removable straw of FIG. 1 in greater detail as well as other features.

In more detail, consider FIG. 2, which illustrates the non-removable straw 106 in greater detail. The non-removable straw 106 includes a main shaft 202, a base end 204, and a rim end 206. The base end 204 has one or more holes 208 (see FIG. 1 for an alternative) through which the retained liquid can be drawn from the base end 204 through the main shaft 202 and to the rim end 206 through negative pressure (e.g., negative relative to pressure at the base end 204, also called "suction") at the rim end 206. These holes 208 can be at the main shaft 202 and/or along one or more extension portions 205 at the base send 204. By so doing, liquid can be drawn through multiple, physically separated holes, thereby reducing blockage from one or more objects (e.g., lemon seeds in lemonade, larger particles in fruit smoothies, smaller ice pieces, and so forth). Note also that the base end 204, along with the extension portions 205, can be at or very near the base 110. This allows for all for very nearly all of the liquid in the cup body 108 to be drawn up through the non-removable straw 106, reducing potential waste and enabling a positive user experience. These extension portions 205 (shown at 205-1 and 205-2) can extend all around the base 110 (not shown) with holes placed around all of the base 110, or extend from the base end 204 with simply one hole, as well as alternatives, such as $\frac{1}{3}^{rd}$ around the base 110 for each of two extension portions 205, $\frac{1}{4}^{th}$, $\frac{1}{8}^{th}$, and so forth. Furthermore, each of the holes 208 can be of different sizes, for example to equalize (or vary) pressure at the holes 208, as holes may have different relative pressures based on various factors (e.g., by the extension portions 205 having different cross-sectional areas than the main shaft, see Bernoulli's equation, and other factors).

The main shaft 202 has an integral portion 210 and non-integral portion 212. The integral portion 210 is integrated with the wall 112 of the cup body 108 sufficient for the non-removable straw 106 to remain attached to the cup body 108. In some cases, the integral portion 210 shares an interior surface 214 of the wall 112. This sharing of the interior surface 214 of the wall may extend, with or without interruption, from the rim 114 of the cup body 108 to the base 110 of the cup body 108 or from the rim 114 of the cup body 108 to within 0.0 to 10 mm of the base 110 (see in FIG. 1, an example of about two to five millimeters at alternative straw base end 118).

By so doing, the wall 112 acts as a portion of the main shaft 202. Thus, a portion 214 of the main shaft 202 includes an outer straw surface 216 making up a portion of a surface of the wall 112 of the cup body 108. In some cases, this can further reduce costs and reduce waste by reducing an amount of material used. Thus, in some cases, by sharing the material of the wall 112, the disposable beverage cup with non-removable straw 102 may use less material overall than a conventional straw and separate disposable beverage cup. This material savings is not required for the disposable beverage cup with non-removable straw 102 to solve at least some of the many problems described above, however.

The non-integral portion 212, in some cases, is configured to extend or be extendable beyond the rim 114 sufficient for the rim end 206 to be accessible. The non-integral portion 212 can be straight or slightly bent or even substantially bent, but generally projects above or away from the rim 114 to aid in it being accessible. By being accessible, it is allows a user to draw, through suction, the retained liquid up to the rim end 206.

Note that the non-removable straw 106, in some cases, can be non-projecting, and thus generally level with (or not projecting horizontally as well from the rim 114) from a plane intersecting the rim 114 of the cup body 108 (not shown). Thus, the non-removable straw 106 may not include the non-integral portion 212. In such a case, a sanitary seal or cover can be used to protect, seal, or close the rim end 206 of the non-removable straw 106 without a bend in the non-removable straw 106, such as with a paper, disposable cover, sheet with an adhesive and so forth. These can also be used for a bent straw (described in detail below) or a non-bent straw that projects from the rim 114 (e.g., a paper cover to the non-integral portion 212 without a bend). It may instead be bent (shown later herein). As noted, the non-integral portion 212 can be configured to not share a portion of the wall 112 of the cup body 108, instead being fixed to the wall but not sharing a structure or surface with the wall 112.

FIG. 2 also illustrates some of the many different types of non-removable straw 106 configurations. For example, the non-removable straw 106 can be fully within the interior 116 (shown in FIG. 1), shown at interior straw 106-1. Other examples include an exterior straw 106-2, and wall-interrupting straw 106-3, which includes both interior and exterior portions. FIG. 2 shows an optional straw relief 218, which is illustrated and described in great detail below.

Figure 3:
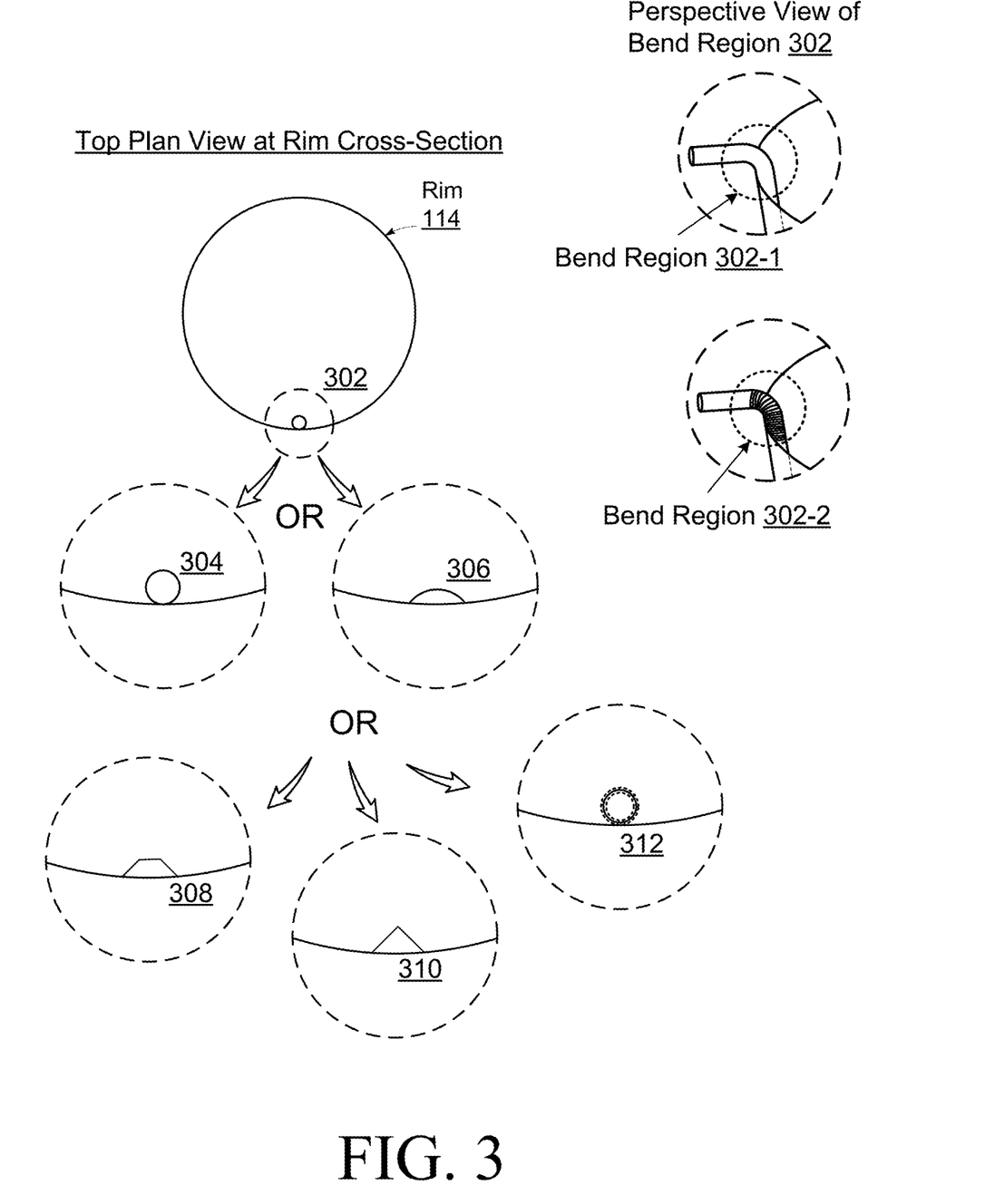
FIG. 3 illustrates alternative non-removable straw designs.

Before describing the straw relief 218, consider FIG. 3, which illustrates additional, alternative non-removable straw 106 designs. These are shown in top-plan view at a cross-section of the rim 114, and do not necessarily represent a form of the non-removable straw 106 at the rim end 206. These alternative non-removable straw 106 designs, at least at either of bend regions 302, are configured to enable the non-removable straw 106 to be bent sufficient to attach the rim end 206 to the cup body 108 or the integral portion 210. Here the bend regions 302 include the bend of the non-integral portion 212 of the main shaft 202 of the non-removable straw 106. Further, on being unbent (fully or partially), and thus accessible to a user, the non-removable straw 106 at the bend region 302 may be weaker, and thus subject to collapse, at the bend region 302. This can be especially problematic with straws that are highly flat, as these flat-shaped straws are additionally subject at the bend and throughout the straw to collapse under negative (suction) pressure.

These alternatives may aid in preventing collapse, or at least preventing complete collapse that, at a normal negative pressure applied by a user, may cause the non-removable straw 106 to be unable to draw, at a sufficient rate, the retained liquid to the rim end 206. These bend region 302 configurations include a round cross-section 304, a wide-arc cross-section 306, a trapezoid cross-section 308, a triangle cross-section 310, and a bellows cross-section 312. Note that bend region 302-1 illustrates a perspective view of the round cross-section 304 and the bend region 302-2 illustrates a perspective view of the bellows cross-section 312. Furthermore, this bend region 302 can be reinforced through additional material, internal structures, articulation, and so forth to aid in preventing collapse under negative pressure.

At the bend region 302, or at other regions not subject to bending, a shape of the non-removable straw 106 can be of a columnar shape with a cross-section that is a conic section, not a conic section, or can be partial arc, such as the arc of the wall 112 at a portion of the cross section, or any of the cross-sections described herein. Thus, the wall section of the non-removable straw 106 can follow the arc of the wall while a non-wall section is triangular, trapezoidal, partial-circle shaped, articulated, and so forth, e.g., one of the designs set out in FIG. 3.

Figure 41:
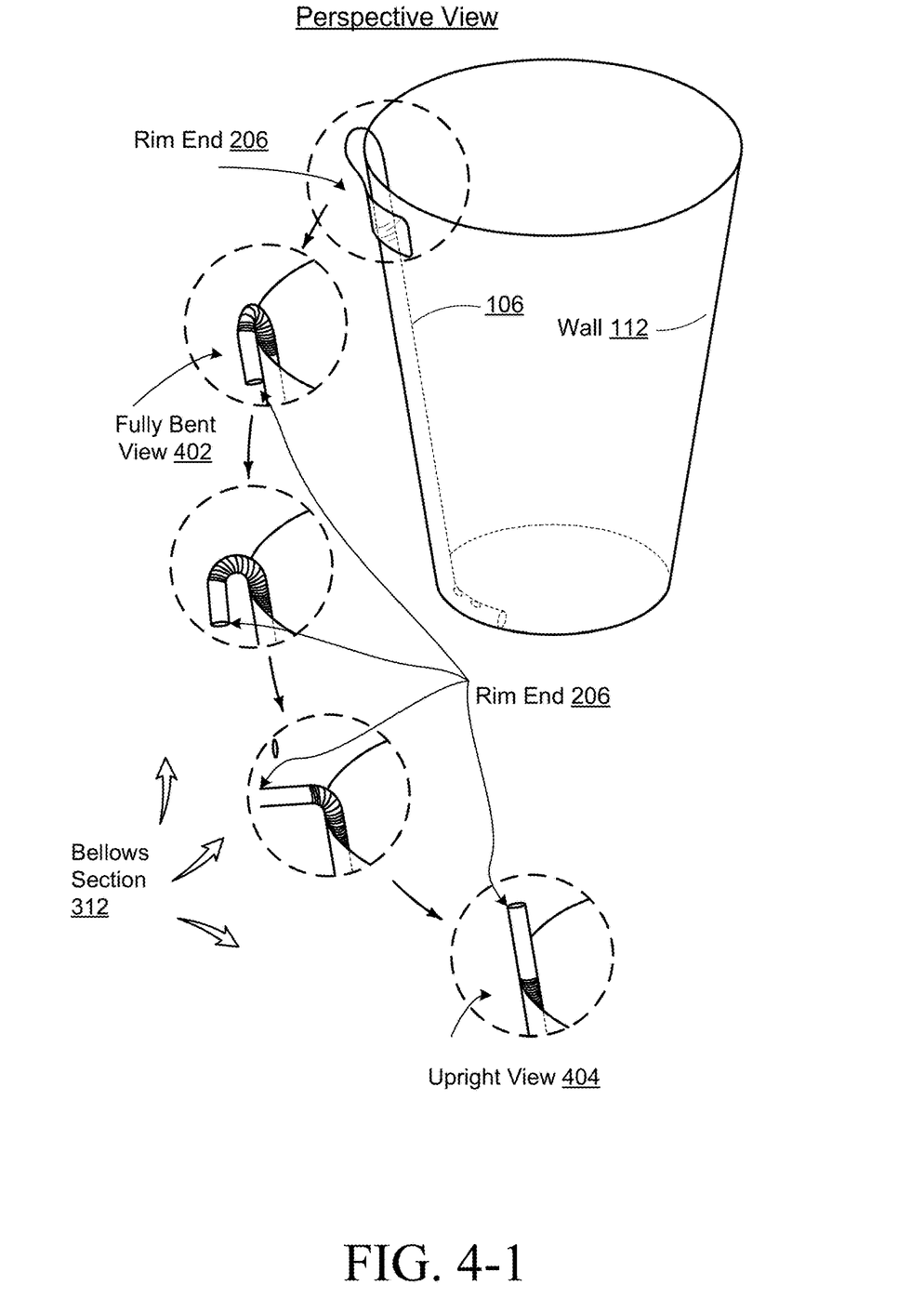

In more detail, consider FIG. 4-1, which illustrates the non-removable straw 106 where the non-removable straw 106 is configured to bend sufficient for the rim end 206 to be temporarily attached to the wall 112 of the cup body 108 or an outer surface of the integral portion 210 of the main shaft 202 of the non-removable straw 106 (not shown, e.g., the rim end 206 being bent into the interior of the cup). As illustrated, the non-integral portion 212 of the non-removable straw 106 can be attached, but detachable, from the cup body 108 (or interior of the non-removable straw 106's integral portion). FIG. 4-1 shows the non-removable straw 106 with the bellows section 312 at the bend region 302. The non-integral portion 212 of with the bellows section 312 is shown as bent and attached and then being released until the rim end 206 of the non-removable straw 106 is accessible. As noted, the non-removable straw 106's rim end 206 can be attached and covered. This can aid in keeping the rim end 206 sanitary.

As illustrated in FIG. 4-1, the non-removable straw 106 may be structured in a manner that permits bending with little or no reduction in the cross-section at the bend. One such manner is shown at the bellows section 312 (shown in perspective view in FIGS. 3 and 4-1). The bellows section 312 can include an articulated region or concertina hinge, thereby permitting a bend but on straightening and use, a structure resistant to collapse under suction.

Figure 42:
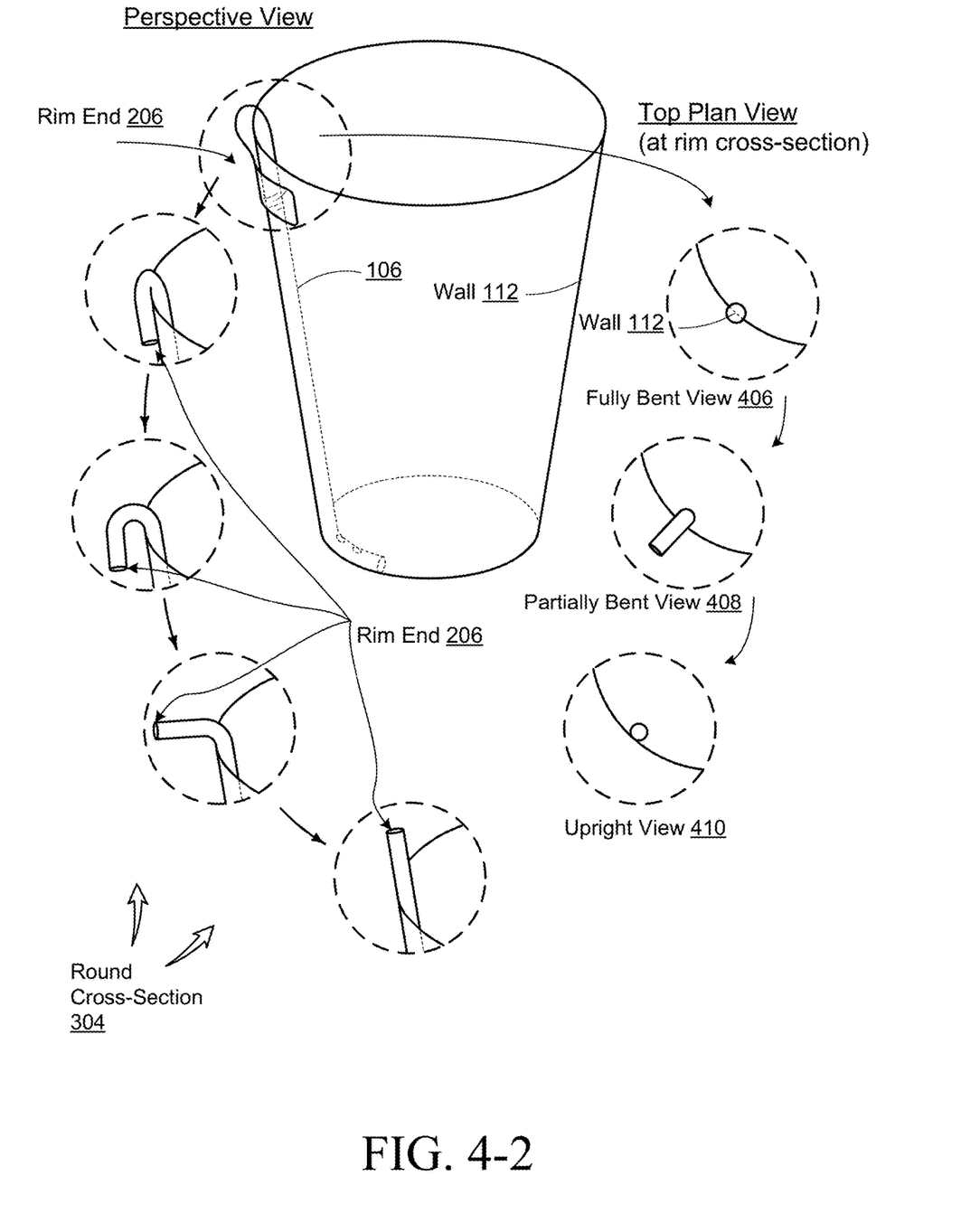

FIG. 4-2 illustrates, similar to FIG. 4-1, the non-removable straw 106 where the non-removable straw 106 is configured to bend sufficient for the rim end 206 to be temporarily attached to the wall 112 of the cup body 108 or an outer surface of the integral portion 210 of the main shaft 202 of the non-removable straw 106. Rather than illustrate the bellows section 312, however, FIG. 4-2 illustrates the round cross-section 304. FIG. 4-2 also illustrates a top-plan view (at rim cross-section) of the round cross-section 304, showing a case where straw is round at the bend section 302 and showing the straw in a fully bent, partially bent, and upright views at 406, 408, and 410, respectively.

In both FIGS. 4-1 and 4-2, the rim end 206 is illustrated and, when fully bent and attached to the wall 112, shown nearly flat to the wall 112 and the rim 114. Consider examples illustrated in FIG. 5, which shows the rim end 206 covered and held in a bent-flat state 502 and covered by a sanitary guard 504. The bent-flat state 502 is a case where the non-integral portion 212 (see also FIG. 2) of the non-removable straw is bent flat or nearly so over the rim 114, thereby permitting no or little obtrusion when the disposable beverage cup with non-removable straw 102 is being filled with liquid, handled, and so forth prior to releasing the non-integral portion 212 to draw up the liquid in the cup body 108.

Figure 5:
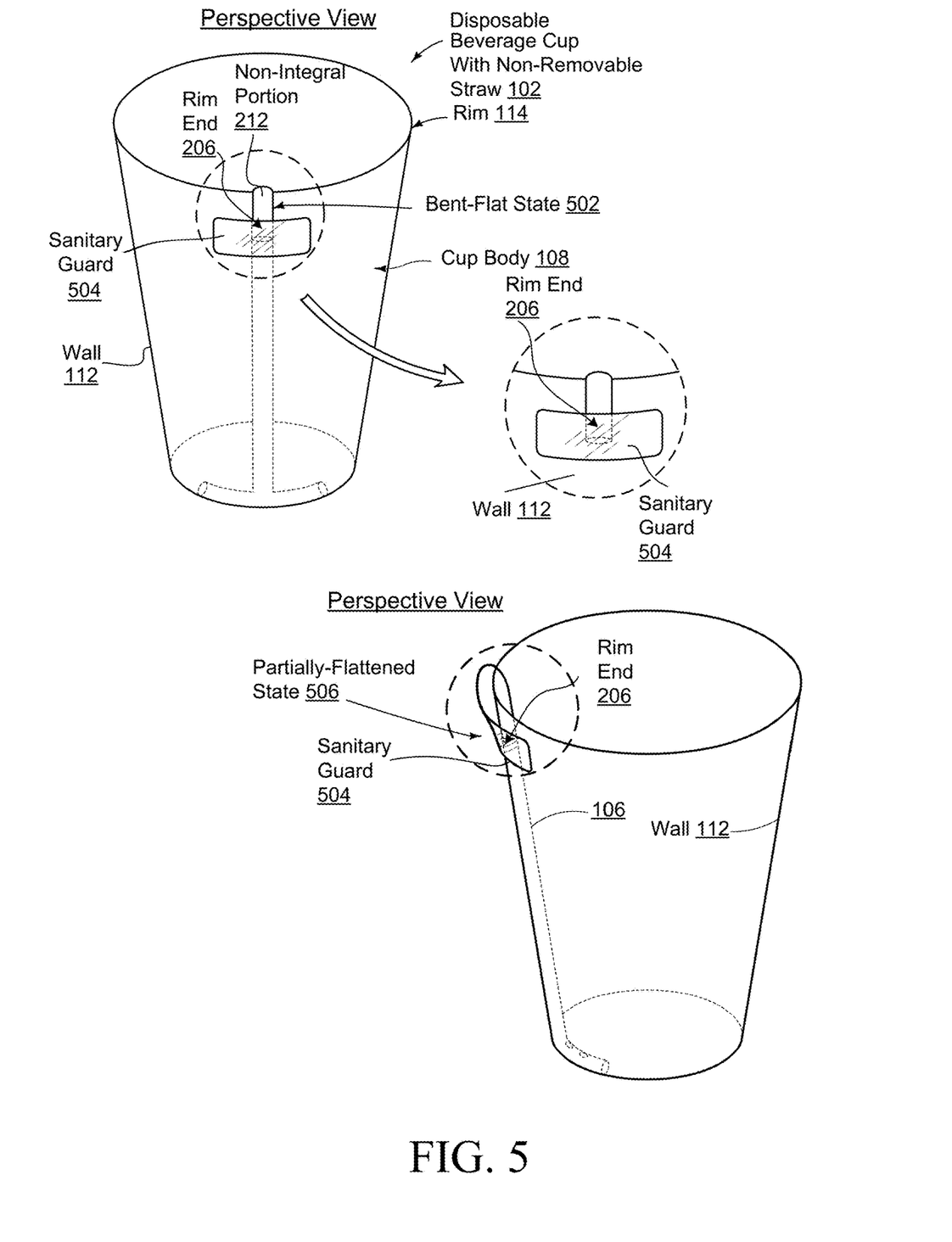
FIG. 5 illustrates a rim end of a non-removable straw attached to a wall of a cup body.

Consider another example illustrated in FIG. 5, which shows the rim end 206 covered and not held in the bent-flat state 502, but instead partially flattened only at partially flattened state 506. While flattening the rim end 206 can aid in stacking densely (see FIG. 7), doing so may, in some cases, increase the possibility of collapse of the non-integral portion 212 under negative pressure. Note also that the non-integral portion 212 of the non-removable straw is not bent flat at the rim 114. While this example shows some obtrusion when the disposable beverage cup with non-removable straw 102 is being filled with liquid, handled, and so forth prior to releasing the non-integral portion 212 to draw up the liquid in the cup body 108, resistance to collapse under negative pressure can be reduced.

In more detail, the rim end 206 in both examples is covered and held by the sanitary guard 504. The sanitary guard 504 can one or two pieces, or one piece with multiple areas with and without adhesive, such as by having an attaching the sanitary guard 504 to the wall 112 but no adhesive attaching the sanitary guard 504 to the rim end 206. This can aid in the rim end 206 not having any unpleasant smell, taste, or texture caused by an adhesive.

As noted, the rim end 206 of the non-removable straw 106 can be covered and held bent or it can be held bent by being temporarily attached to the interior surface of the wall 112, the exterior surface 220 of the wall 112, or the exterior surface of an integral portion 210 of the main shaft 202.

Note that the sanitary guard 504 can be configured to offer as little protection as a paper cover of a conventional straw, meaning that it can simply cover the rim end 206 (e.g., bent or erect), and perhaps most or all of the non-integral portion 212, preventing some minor, non-liquid soiling of the rim end 206 (as many conventional paper covers offer minor protection and are susceptible to liquids), or simply offer evidence that the covering has been soiled. These allow a user or a service person at a beverage seller to notice that a straw or an end of the straw may be contaminated, but generally do not keep the straw sterile.

Alternatively, the sanitary guard 504 may be sterile, offering greater protection, such as through have an interior coating that prevents bacterial growth. Other options for the sanitary guard 504 are also envisioned, including a non-adhered tab to enable easy removal of the sanitary guard 504, advertisements on the sanitary guard 504, or a permanent adhesive to a small portion of the sanitary guard 504 such that, on remove of most of the guard, the bent straw is released, but the sanitary guard 504 remains on the wall 112 to prevent needless separation, and therefore pollution of the environment with the sanitary guard 504.

The sanitary guard 504 can also act to temporary attach the rim end 206 to the wall 112, e.g., the outer surface of the wall. The sanitary guard 504 can be sufficient to hold the rim end 206 to the wall 112 while also providing a sealed, sanitary cover for the rim end 206. Further, the sanitary guard 504 can be configured, when detached sufficient for the straw to be released from the temporary attachment, to indicate that that sanitary guard has been tampered with. Thus, the sanitary guard 504 can be configured to not be easily reattached without showing that it was altered, or, in some cases, difficult to reattach at all.

Furthermore, as also illustrated in FIG. 5 at the partially-flattened state 506, the sanitary guard 504 can be structured to aid in reducing collapse of the straw 106 by permitting the straw to retain much of its shape while also acting to protect the end of the straw 106 from contamination. Further still, in some cases the sanitary guard permits the rim end 206 to retain its original shape by the sanitary guard 504 being shaped to accommodate a straw end having one of the cross-sections noted in FIG. 3; similar to the straw relief 218 of FIG. 2. In such a case the sanitary guard 504 is formed to accommodate the rim end 206's original shape with little or no flattening, and formed for the sanitary guard 504 to remain in contact with the wall 112 at portions surrounding the rim end 206 (e.g., on three sides).

While the non-integral portion 212 is illustrated at a particular length through this document, various lengths are envisioned. For example, a longer non-integral portion 212 may permit additional length at the rim end 206 to be covered by the sanitary guard 504, thereby increasing a user's confidence that the portion touching their lips has been adequately protected. Furthermore, many users do not put their lips at the very end of the rim end 206, but somewhere further down the non-integral portion 212, such as 5 to 15 millimeters from the rim end 206. These distances from the rim end 206 can be covered by the sanitary guard 504 through a larger guard and additional non-integral portion 212.

Returning to FIG. 2, consider the straw relief 218. This straw relief 218 can be concave or convex relative to the rim 114 and the wall 112 of the cup body 108. The straw relief 218 can be configured to accept a portion of another non-removable straw of another disposable beverage cup that is similarly-shaped or identically-shaped to the disposable beverage cup such that, when the other disposable beverage cup is placed within the interior of the disposable beverage cup, the straw relief 218 accommodates the other non-removable straw of the other disposable beverage cup. As illustrated in FIG. 2, the straw relief 218 can include various different configurations, interior-straw relief 218-1, exterior-straw relief 218-2, and wall-interrupting-straw relief 218-3, each of the configuration designed to accommodate a non-removable straw's shape, here the non-removable straws 106-1, 106-2, 106-3, respectively. Note that FIG. 2 includes perspective and top-plan views (with the top-plan view at a cross-section of the rim 114 and not necessarily representing a form of the non-removable straw 106 at the rim end 206).

Figure 6:
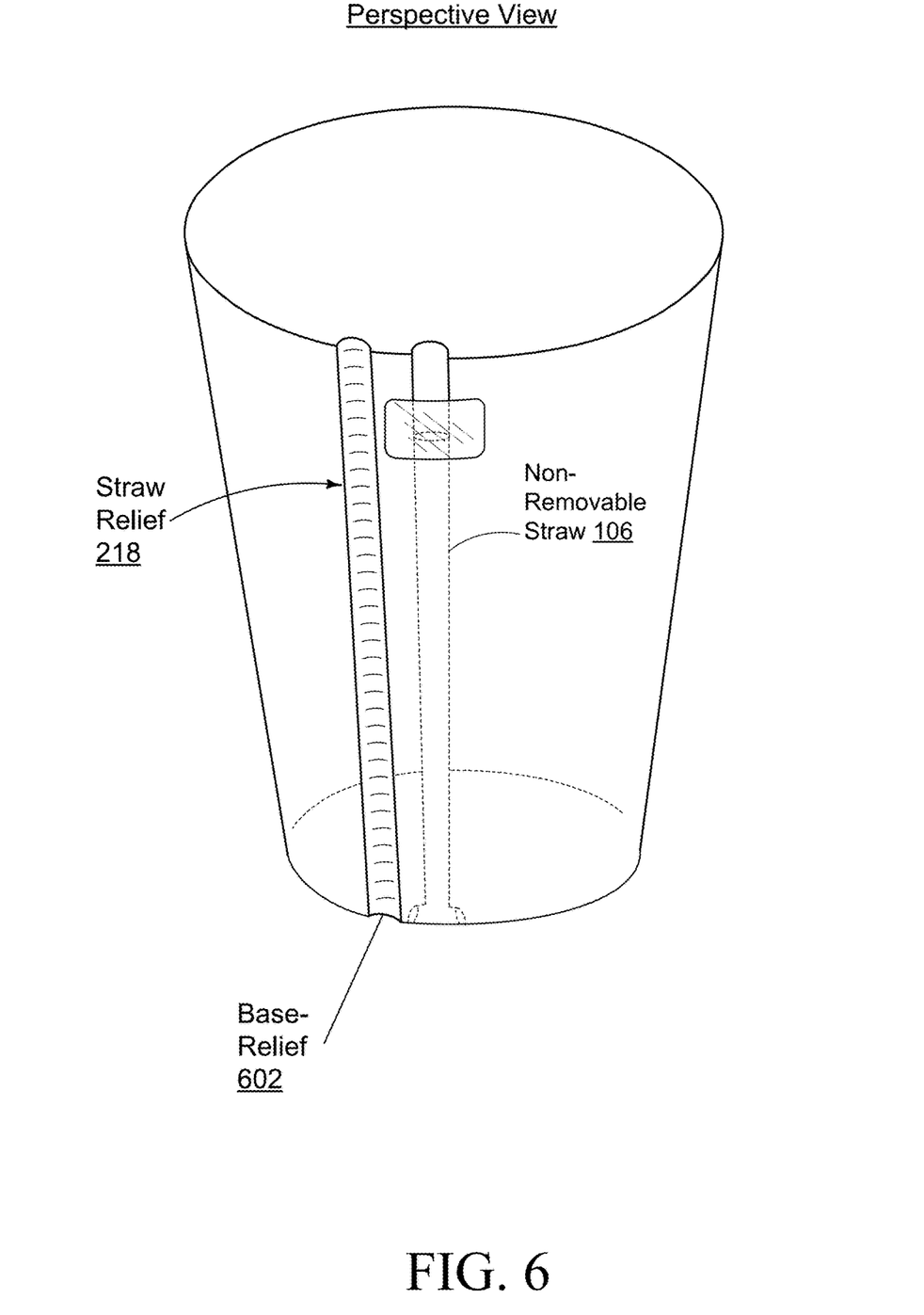
FIG. 6 illustrates a straw relief.
Figure 7:
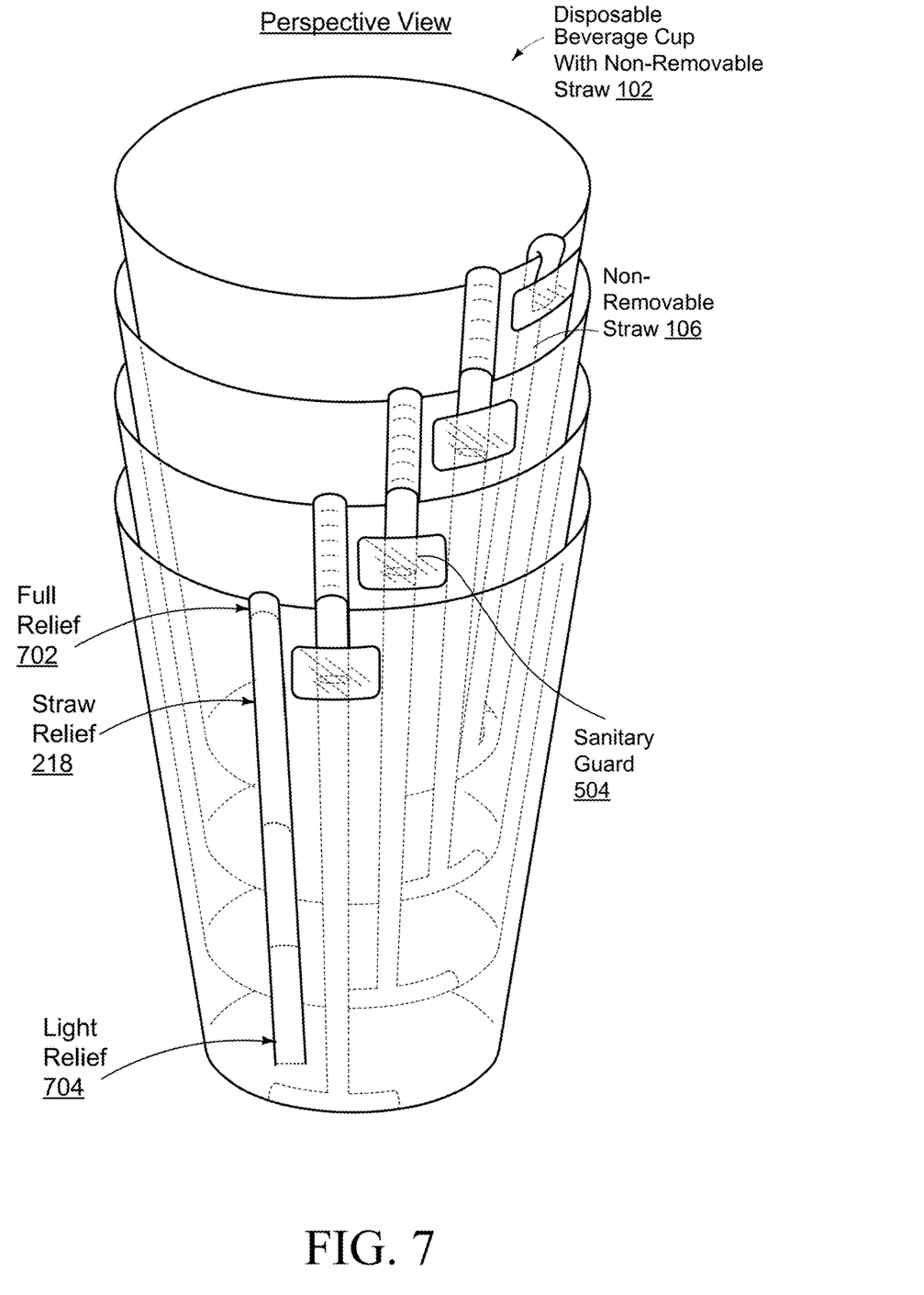
FIG. 7 illustrates stacking of disposable beverage cups with non-removable straws.

The straw relief 218, as shown in FIG. 6, can be near offset from exactly opposite to the non-removable straw 106. By so doing, the disposable beverage cup with non-removable straw 102 can be stacked more easily, more densely, or in a rotational arrangement. This stacking is shown in FIG. 7. Note that the stacking in FIG. 7 shows that the disposable beverage cup with non-removable straw 102 can be stacked while retaining the sanitary behavior of the rim end 206 of each of the non-removable straws 106. The straw relief 218 of each of the disposable beverage cup with non-removable straw 102s in FIG. 7 may, but is not required to be, from the rim 114 of the cup body 108 to the base 110 of the cup body 108 (shown in FIG. 6 with base-relieve 602 thereby providing a full-length straw relief). This also enables the disposable beverage cups with non-removable straws 102 to stack densely. In some cases, however, the straw relief 218 gradually transitions from full relief, meaning that the non-removable straw 106 of another cup fully fits within the relief, to less and less relief, such shown in FIG. 7 graduating from full relief 702 to light relief 704. This can act to elevate, and provide some separation from stacked cups, thereby enabling easier physical separation when pulling one cup from the stack.

Figure 8:
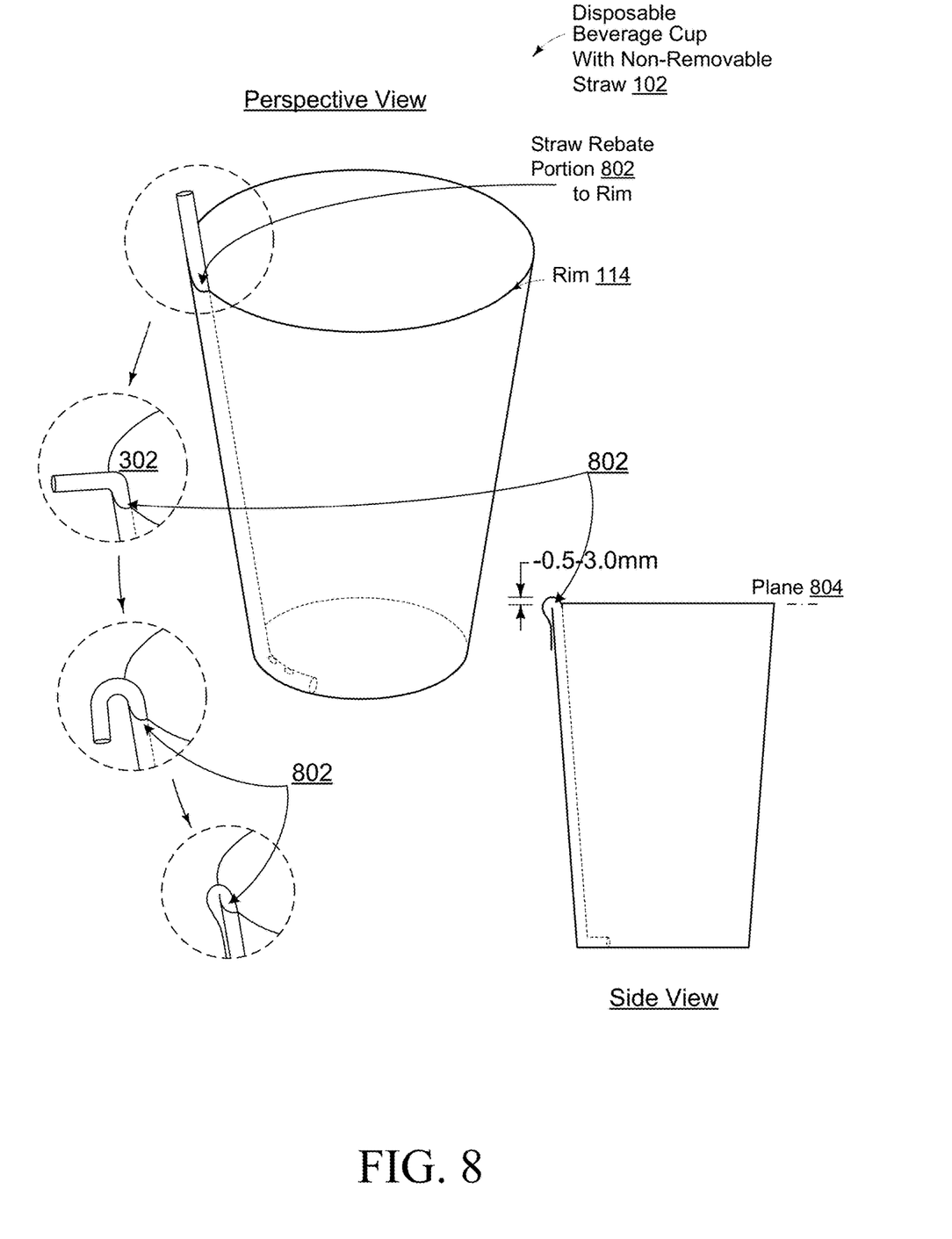
FIG. 8 illustrates a straw rebate portion of a rim of a cup body.

In some cases, the disposable beverage cup with non-removable straw 102 includes a rebated rim. An example is shown in FIG. 8, which illustrates the rim 114 having a straw rebate portion 802. The straw rebate portion 802 can be a rebate from the perspective of a plane 804 intersecting an outer edge of the rim 114. Here the rebate is intended to include a dip in the wall 112, or otherwise a discontinuity in the conic-section cross-section at the rim 114 of the cup body 108.

The straw rebate portion 802 coincides with a location of a bend region 302 of the non-removable straw 106 to accommodate material of the non-removable straw that otherwise projects, when bent, above the plane 804 of the outer edge of the rim 114. In some cases this is not a concern, but in the case of some types of lids, the projection can make secure attachment of the lids difficult or cause them to leak. The height of this projection can be reduced with the straw rebate portion 802. The straw rebate portion 802 can be configured such that a top-bend-height portion of the bend of the straw is within between negative three millimeters to positive three millimeters, with some rebate portions and straw materials and structure permitting ranges in heights, such as −0.5 to 0.5 mm, 0.0 to 1.0 mm, 0.5 to 1.5 mm, 0.5 to 3 mm, and so forth. As described later below, some types of lids can be configured, as disclose herein, to permit greater attachment and leak prevention even with a bend in the non-removable straw as described.

Figure 9:
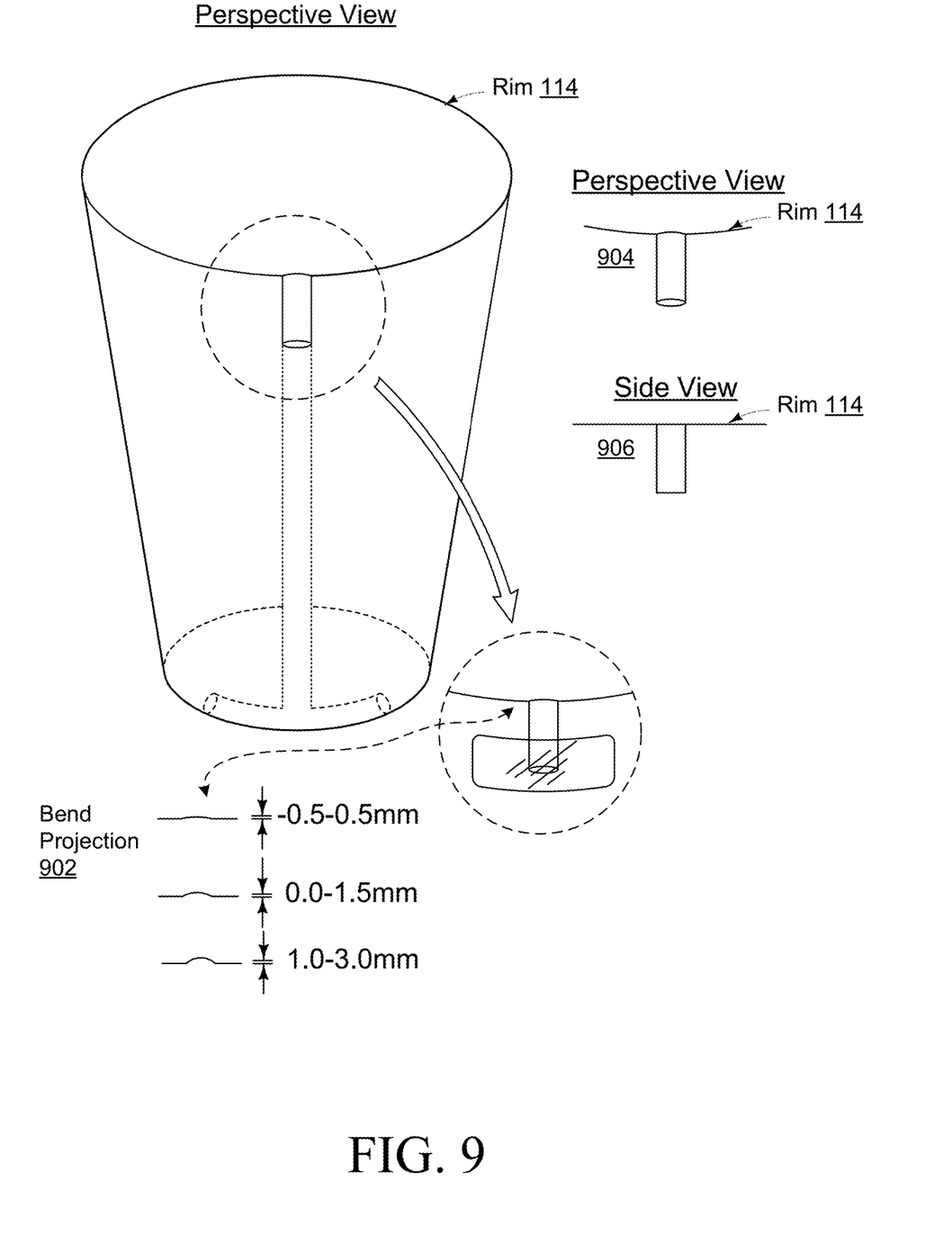
FIG. 9 illustrates example heights of a bend projection, as well as perspective and side views of a small or nearly zero bend projection.

In more detail, consider FIG. 9, which illustrates example heights of a bend projection 902, as well as perspective and side views (904, 906) of a small or nearly zero bend projection 902.

Before further discussion of example lid designs, note that the disposable beverage cup with non-removable straw 102, including the non-removable straw 106 and the cup body 108, can be made of the same or different materials. These materials can be clear or other transparent plastic, a plastic-paper combination of materials, various other polymers, compostable or non-compostable, other organic materials (e.g., bamboo, kelp, and similar renewable resources) and insulated for use with hot beverages or non-insulated.

Furthermore, the disposable beverage cup with non-removable straw 102 can be manufactured using various different manners, such as though molding. Examples include heating and them molding of thermoplastic materials, such as polyethylene, polypropylene, polystyrene, polyvinyl, and various bioplastics and biodegradable plastics. These moldable materials permit manufacture of shapes (e.g., the straw relief 218, straw cross-sections 302-308, and the base end 204 having holes 208) that are not practical for manufacture with many other materials. Materials and processes that are impractical for molded shapes include many paper manufacturing techniques, such as forming a paper cup using planar blanks of paper or similar material and then forming a blank into a wall and then sealing the wall to a planar bottom through an adhesive and/or crimping.

Disposable Lid

Figure 10:
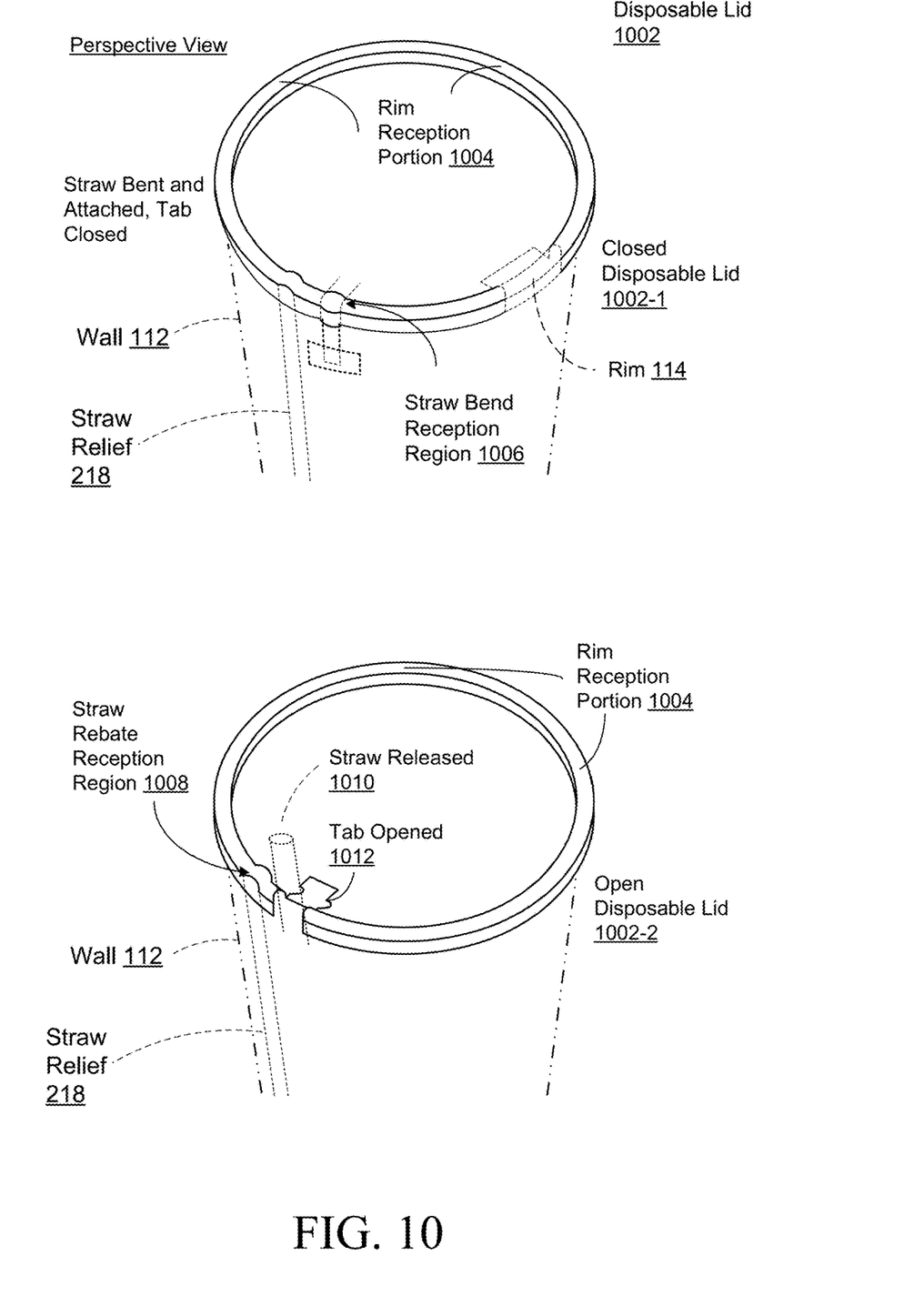
FIG. 10 illustrates an example disposable lid configured to accommodate the above rims, straw bends, and/or straw reliefs.

FIG. 10 illustrates an example disposable lid 1002 for a disposable beverage cup. The disposable lid 1002 is shown closed at 1002-1 and open at 1002-2. The disposable lid 1002 includes a rim reception portion 1004, the rim reception portion configured to surround an outer wall surface adjacent the rim 114 of the disposable beverage cup, a surface of the exterior wall at the rim 114, and an interior wall surface adjacent the rim 114. The rim reception portion 1004 generally is configured to attach the disposable lid 1002 to the rim 114 of the disposable beverage cup with non-removable straw 102.

The disposable lid 1002 also includes a straw bend reception region 1006, shown as part of the rim reception portion 1004. The straw bend reception region 1006 is configured to receive a bent straw that is integrated with the disposable beverage cup. Thus, the projection height described in relation to FIG. 9 affects the configuration of the straw bend reception region 1006 such that, given the flexibility of a material of the disposable lid 1002, how much of the rim reception portion 1004 at the bend is configured to accommodate the bend of the non-removable straw 106. Thus, for a flexible material of the disposable lid 1002 and a projection height of 0.5 to 1.0 mm, the straw bend reception region 1006 may be 0.2 to 0.7 mm or 0.0 to 0.5 mm in height above a plane intersecting a top surface of a majority of the rim reception portion 1004.

Further, the disposable lid 1002 may include a straw rebate reception region 1008. The straw rebate reception region 1008 is configured to receive a convex or concave portion of the rim 114 (and some portion of the wall 112). Thus, the straw relief 218 described above can be accommodated by the disposable lid 1002.

In addition, the disposable lid 1002 can be configured to accommodate release of the non-removable straw 106 to a non-bent state, such as shown with the non-removable straw 106 released at 1010. In more detail, the straw bend reception region 1006 can include a relief portion having perforations. These perforations are configured to permit straightening of the bent straw to an upright position while permitting the disposable lid 1002 to continue to remain fixed to the rim 114 of the disposable beverage cup with non-removable straw 102. This is shown with a straw released at 1010 and a tab opened at 1012.

While shown with a tab and perforations, in some cases a lid or portion of the disposable lid 1002 at the straw bend reception region 1006 is of a material and thickness configured to permit, responsive to the straw being unbent in an upright position, to maintain the seal of the rim without separating a tab from the disposable lid. Example materials and thicknesses are similar, though often thicker than, cellophane, as well as other food-safe thin films.

As noted above, the cross-section of the non-removable straw 106 at the rim 114 can include different options, and thus, the straw bend reception region 1006 can be configured to accommodate these different options, shown in FIG. 3. Note that FIG. 3 shows the cross-sections unbent, and thus, the bent shape will be accommodated by the straw bend reception region 1006.

The disposable beverage cups with non-removable straws 102 are illustrated with conic-section-shapes, such as at the rim 114. While not required, this shape is well understood and accepted by users. The rim reception portion 1004 can be configured to receive a conic-section-shaped rim of the disposable beverage cup with non-removable straw 102. The conic-section-shaped rim is not perfectly conic, as it comprises the straw rebate reception region 1008 or the straw bend reception region 1006.

In some cases a lid is not used, but rather the disposable beverage cup with non-removable straw 102 is configured for a heat-sealed flexible plastic (e.g., similar to cellophane) In such a case, the heat-sealed flexible plastic is enabled to seal the rim 114, the straw relief 218, and the straw bend region 302. This configuration includes a small projection height, such as less than 1.5 mm, as described in FIG. 9. By so doing, existing heat-sealers that required a nearly flat cup rim can be used (e.g., two millimeters plus or minus from a plane of the rim 114 of the disposable beverage cup with non-removable straw 102, or plus or minus one millimeter, or plus or minus one-half of one millimeter).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:
1. A disposable beverage cup comprising:
a non-removable straw;
a sanitary seal or cover; and
a cup body, the cup body having a base, wall, and rim, the cup body configured to retain liquid; and
the wall connecting the base and the rim and defining an interior of the disposable beverage cup, the interior configured to hold the retained liquid;
wherein the non-removable straw comprises a main shaft, a base end, and a rim end,
the base end having one or more holes through which the retained liquid can be drawn from the base end through the main shaft and to the rim end through suction at the rim end;
the main shaft having an integral portion and non-integral portion,
the integral portion and the non-integral portion being contiguous portions of the non-removable straw;
the integral portion integrated with the wall of the cup body;
the non-integral portion being bent and temporally attached to the wall or an outer surface of the integral portion of the main shaft; and
the rim end sealed, closed, or protected by the sanitary seal or cover,
the rim having a rebate at a rebated portion, the rebate from a plane intersecting an outer edge of the rim of the disposable beverage cup, the rebated portion coinciding with a location of a bend of the non-removable straw such that a top-bend-height portion of the bend of the straw, relative to the plane, is configured to accept a nearly flat rim reception portion of a disposable lid.
2. The disposable beverage cup of claim 1, wherein the temporary attachment to the wall is to an outer surface of the wall.

3. The disposable beverage cup of claim 1 wherein the sanitary seal or cover is a sanitary guard, the sanitary guard covering a rim end of the non-integral portion of the main shaft of the non-removable straw.
4. The disposable beverage cup of claim 3, wherein the sanitary guard is attached to the wall sufficient to cause the temporary attachment of the rim end of the non-integral portion to the wall or the outer surface of the integral portion of the main shaft.
5. The disposable beverage cup of claim 3, wherein the sanitary guard is configured, when detached sufficient for the straw to be released from the temporary attachment, to indicate that the sanitary guard has been tampered with.
6. The disposable beverage cup of claim 1, wherein the rim of the cup body of the disposable beverage cup is further configured to accept a disposable lid that is heat-sealed to the rim.
7. The disposable beverage cup of claim 6, wherein the disposable lid to be accepted is a heat-sealed flexible plastic, the heat-sealed flexible plastic enabled to seal the rim through a rebated section, the rebated section at the bend of the straw such that the top-bend-height portion of the bend of the straw is within minus one and one millimeter of the plane intersecting the outer edge of the rim of the disposable beverage cup.
8. The disposable beverage cup of claim 1, further comprising the rim and the wall both having a straw relief configured to accept a portion of a second non-removable straw of another disposable beverage cup that is similarly-shaped or identically-shaped to the disposable beverage cup when the other disposable beverage cup is placed within the interior of the disposable beverage cup.
9. The disposable beverage cup of claim 1, wherein the non-removable straw shares, at an outer surface of the integrated portion of the main shaft of the non-removable straw, a portion of the wall.
10. The disposable beverage cup of claim 9, wherein the portion of the wall at which the non-removable straw shares the outer surface of the integrated portion of the main shaft extends, without interruption, from the rim of the cup body to the base of the cup body.
11. The disposable beverage cup of claim 1, the rim configured to accept a disposable lid having:
a rim reception portion, the rim reception portion configured to surround a majority of an outer wall surface adjacent the rim of the disposable beverage cup; and
a straw reception region, the straw reception region of the rim reception portion, the straw reception region configured to receive a bent portion of the non-removable straw where the bent portion has the top-bend-height portion of the bend of the straw, relative to the plane, being between minus one and three millimeters.
12. The disposable beverage cup of claim 11, where the rim is further configured to accept the disposable lid having a straw rebate reception region, the straw reception region of the rim reception portion, the straw rebate reception region configured to receive a convex or concave portion of the rim.
13. The disposable beverage cup of claim 1, wherein the non-integral portion includes a bellows section at which the non-integral portion is bent.
14. The disposable beverage cup of claim 1, wherein the top-bend-height portion of the bend of the straw, relative to the plane, is configured to accept the nearly-flat rim reception portion of the disposable lid through having the top-bend-height portion of the bend of the straw relative to the plane being between minus one and positive one and one half millimeters.

15. The disposable beverage cup of claim 1, wherein the sanitary seal or cover includes a non-adhered tab.

16. A disposable beverage cup comprising:
a non-removable straw;
a sanitary seal or cover; and
a cup body, the cup body having a base, wall, and rim,
  the cup body configured to retain liquid; and
  the wall connecting the base and the rim and defining an interior of the disposable beverage cup, the interior configured to hold the retained liquid;
wherein the non-removable straw comprises a main shaft, a base end, and a rim end,
  the base end having one or more holes through which the retained liquid can be drawn from the base end through the main shaft and to the rim end through suction at the rim end;
  the main shaft having an integral portion and non-integral portion,
    the integral portion and the non-integral portion being contiguous portions of the non-removable straw;
    the integral portion integrated with at least a portion of the wall of the cup body;
    the non-integral portion projecting from the rim;
    the rim end of the non-integral portion projecting from the rim being sealed, closed, or protected by the sanitary seal or cover,
  wherein the sanitary seal or cover covers the rim end of the non-integral portion projecting from the rim and is attached to the wall of the cup body.

17. The disposable beverage cup of claim 16, wherein the sanitary seal or cover is attached to an outer surface of the wall of the cup body.

18. The disposable beverage cup of claim 17, wherein the sanitary seal or cover is made with paper or plastic and sealed, to the outer surface of the wall of the cup body, with an adhesive.

19. The disposable beverage cup of claim 16, wherein the non-integral portion projecting from the rim is not bent.

20. The disposable beverage cup of claim 16, wherein the non-integral portion projecting from the rim is partially bent.

* * * * *